United States Patent [19]
Leiber

[11] Patent Number: 4,576,419
[45] Date of Patent: Mar. 18, 1986

[54] VEHICLE ANTI-SKID OR ANTI-BRAKE-LOCK SYSTEM, AND BRAKE CONTROL METHOD

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 598,889

[22] Filed: Apr. 10, 1984

[30] Foreign Application Priority Data

Apr. 12, 1983 [DE] Fed. Rep. of Germany ....... 3313097

[51] Int. Cl.$^4$ ............................ B60T 8/58; B60T 8/64
[52] U.S. Cl. .................................... 303/100; 303/111;
303/114; 303/DIG. 4
[58] Field of Search ...................... 303/20, 93, 95, 96, 303/97, 100, 103, 104, 105, 106, 107, 108, 109, 110, 114, 115, 116, 119, 111, DIG. 4; 188/181 A, 181 C; 364/426

[56] References Cited

U.S. PATENT DOCUMENTS

| | | |
|---|---|---|
| 4,005,910 | 2/1977 | Leiber et al. ............................ 303/96 |
| 4,349,876 | 9/1982 | Lindemann ........................... 303/106 |
| 4,460,963 | 7/1984 | Leiber et al. ............................ 303/97 |

FOREIGN PATENT DOCUMENTS

2518196 11/1976 Fed. Rep. of Germany.
2804854 8/1979 Fed. Rep. of Germany ...... 303/111

Primary Examiner—Duane A. Reger
Assistant Examiner—Alvin Oberley
Attorney, Agent, or Firm—Frishauf, Holtz, Goodman & Woodward

[57] ABSTRACT

A control unit (14, 60) controls the braking pressure (P) at the brakes or the wheels, at both right and left sides of an axle, in accordance with "select-low" and/or "select-high" mode. The system is improved by associating a pressure sensor responsive to braking pressure in at least one of the front wheels. The control unit (14, 60) is so arranged that, upon sensing a tendency to skid or block at the rear wheels (FIG. 3: $t_3$), the pressure at the rear wheels is controlled to a lower level than that at which tendency to block had been sensed, and then a constant pressure maintenance phase is commanded at a predetermined pressure ($P_{oHA}$) for an extended period of time (to $t_8$), for example under control of a timing element (FIG. 2: 19) or until the pressure sensor determines that the braking pressure ($P_{IVA}$) at the front wheels, which there initiated an anti-skid cycle due to a tendency to block, has increased, within the control cycle, by a predetermined value with respect to a similar value ($P_{oVA}$) in a preceding cycle. The increases in pressure level—subsequent to a decrease—are stored in memory elements (FIG. 2: 23; FIG. 6: 65, 66) and compared with then existing pressure levels in a comparator (21; 67, 68) and logically combined to effect the foregoing control function.

21 Claims, 8 Drawing Figures

VEHICLE ANTI-SKID OR ANTI-BRAKE-LOCK SYSTEM, AND BRAKE CONTROL METHOD

Reference to related patent, the disclosure of which is hereby incorporated by reference: U.S. Pat. No. 4,005,910, LEIBER, the inventor hereof, to which German Patent Disclosure Document DE-OS 25 18 196 corresponds.

The present invention relates to a vehicle brake anti-block or wheel anti-skid system in which transducers coupled to the wheels, and monitoring the rotation of the wheels, provide output signals which are electronically processed and which, then, control braking pressure of a hydraulic or pneumatic braking system being applied to the wheels, and more particularly to such a system on which the braking pressure for the wheels of any one axle can be controlled in accordance with operator-selected characteristics, for low or high response if the electronic control system senses a tendency of the respective wheels of the axles to block, which may result in skidding of the wheels.

Background

It has previously been proposed to control wheel brake blocking in which the braking pressure is individually matched to the performance of the respective individual wheels at any time. Additionally to such systems, however, wheel anti-block or anti-skid control systems have been proposed in which the braking pressure is controlled for both wheels of one axle, in common—see the referenced U.S. Pat. No. 4,005,910, LEIBER. The response characteristic of the system can be controlled by an operator. For example, the anti-skid or anti-block system can control braking pressure as soon as one of the wheels decelerates or provides, via its transducer, output signals showing that there is a tendency of the wheel to block. This mode is referred to as the "select-low" mode. It is also possible, however, to commence a control cycle under control of the control system when the last wheel of the axle shows a tendency to block or to skid—in other words, permitting one of the wheels of the axle to skid while waiting for operation of the anti-skid or anti-wheel-blocking system to become effective only when the second wheel also shows a tendency to skid. This selection mode is referred to as the "select-high" mode. The referenced publication also teaches that alternate operation, that is, operation in alternate modes, is possible.

The system as described is particularly simple and easy to install and control; it is entirely suitable for many applications in which the vehicle is designed only for comparatively slow speeds, for example for essentially slow-speed trucks, utility vehicles and the like, which are not primarily adapted for cross-country highway use but, rather, essentially only for slow-speed urban traffic.

It is an object of the invention to further simplify such a system, adapted also to vehicles intended and geared for operation at higher speeds, while also permitting automatic change-over between "select-high" and "select-low" mode of operation if, under certain driving conditions, such change-over is desirable.

The Invention.

Briefly, an additional pressure sensor is coupled to at least the front wheel axle, to sense braking pressure applied to the front axle of the vehicle, and to derive a front wheel pressure signal. The front wheel pressure signal is connected to an electronic control unit which generates pressure control signals to control the braking pressure at the rear wheels under the following conditions:

(1) after a drop in braking pressure at the rear wheels, as a consequence of sensed blocking or tendency to block of a wheel, a pressure $P_{oHA}$ is commanded which is below the pressure at which the tendency to blocking was sensed; and (2) the pressure is then maintained at the constant or steady level until the controlled maximum pressure $P_{VA}$ at the front wheels exceeds the maximum pressure $P_{oVA}$ in the rear wheels by a predetermined level with respect to a preceding control cycle; thereafter, the pressure in the braking circuit for the rear wheels is increased.

The system has the advantage that, by using a pressure sensor at least in the braking system for the wheels of the front axle, less brake fluid is required, since the pressure in the rear wheel braking system is increased only upon substantial change in the pressure of the front wheel system. If a pressure sensor is used for each pressure circuit or system, which is particularly desirable in servo or power braking systems, a more precise control of the braking pressure applied to the brakes of the rear wheels is possible. Particularly simple systems can be constructed in this manner.

The pressure transducers or pressure sensors have the additional advantage that they permit change-over or switchover between previously controlled "select-low" or "select-high" settings. For example, if instability is sensed in the front wheel braking circuit only at a high pressure, for example higher than 60 bar, it is desirable to switch over to the "select-low" mode. Switch-over to "select-high" may be dangerous if the road-way is wet, and can be prevented thereby. If the road-way is asymmetrical, and the system is in the "select-low" mode, it is desirable to switch over to the "select-high" mode upon sensing of a tendency of a wheel to block. The pressure level is determined, and the pressure in the front wheel circuit is raised by a predetermined level, for example by 2-3 times the previous level. This will not cause instability of the wheel which is at the portion of the road-way which has a good, gripping surface. Control of pressure in this manner permits limiting the yaw torque with respect to switch-over of the entire system to a "select-high" mode. The pressure level of the rear axle brakes can be equally raised. It must, of course, then be monitored with respect to "select-high" operation. Use of pressure sensors has the additional advantage that the wheel speed information need be evaluated only rather coarsely, since the pressure sensor permits control of pressure itself. For example, if slip should become excessive, the pressure may drop by half, starting from a base or slip-causing pressure. As the slip decreases, increase of pressure can be controlled to a certain percentage of previously prevailing pressure, for example to about 80% thereof. Preferably, this pressure increase occurs in intermittent steps.

DETAILED DESCRIPTION

Figure 1:
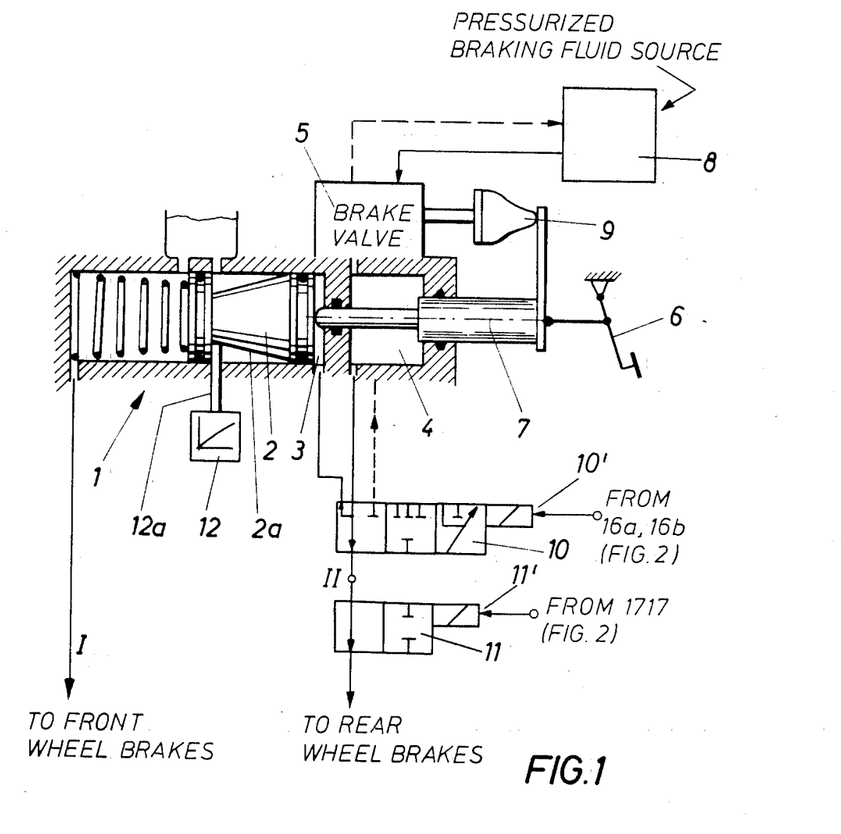
FIG. 1 is a highly schematic diagram of the hydraulic portion of the system, in which the component requirement has been highly reduced.

A main braking cylinder 1—see FIG. 1—has a piston 2 operating therein. The piston subdivides the main cylinder 1 into a control chamber 3 at the right side thereof with respect to FIG. 1, which is coupled to a valve 10, as will appear. A pressure chamber 4 is coupled to a brake valve 5, which is operated by a pedal 6 and to a deflection simulator 9. Brake fluid, under pressure, is supplied by a pressure source or pump 8. A piston 7 provides for feedback of the pressure set by the brake valve in the pressure chamber 4 to the pedal 6, so that the operator, who will engage the brake pedal 6, will receive a feedback counterpressure to improve the "feel" of brake operation. A control valve 10 is provided, formed as a 4/3 valve, that is, a valve having three positions. A blocking valve 11 is provided, formed as a 2/2 valve, coupled to the 4/3 valve 10.

The main braking cylinder 1 is connected into a first braking system or circuit or loop I, which is coupled to the front wheel brakes of the vehicle. The braking circuit for the rear wheels is coupled to the output of the blocking valve 11, shown at II in FIG. 1. A transducer 12, operated via a push rod 12a, is coupled to be deflected by movement of the piston 2 and provides a signal representative of the deflection of the piston 2 from its rightmost position, as shown in FIG. 1, and thus providing a signal representative of braking pressure.

The control valve 10 regulates the braking pressure in both of the braking circuits I and II upon a tendency of the wheels to block, so that the vehicle might skid. In the position shown in FIG. 1, pressure can be built up in both of the circuits I and II. In a second position, the pressure is maintained in both of the circuits I and II, and, in a third position, pressure is dropped in both of the circuits I and II.

In accordance with the present invention, an additional valve 11 is provided which permits maintenance of the pressure in the circuit II at a constant level, when the pressure is changed in the circuit I to be raised, or to be lowered.

Figure 2:
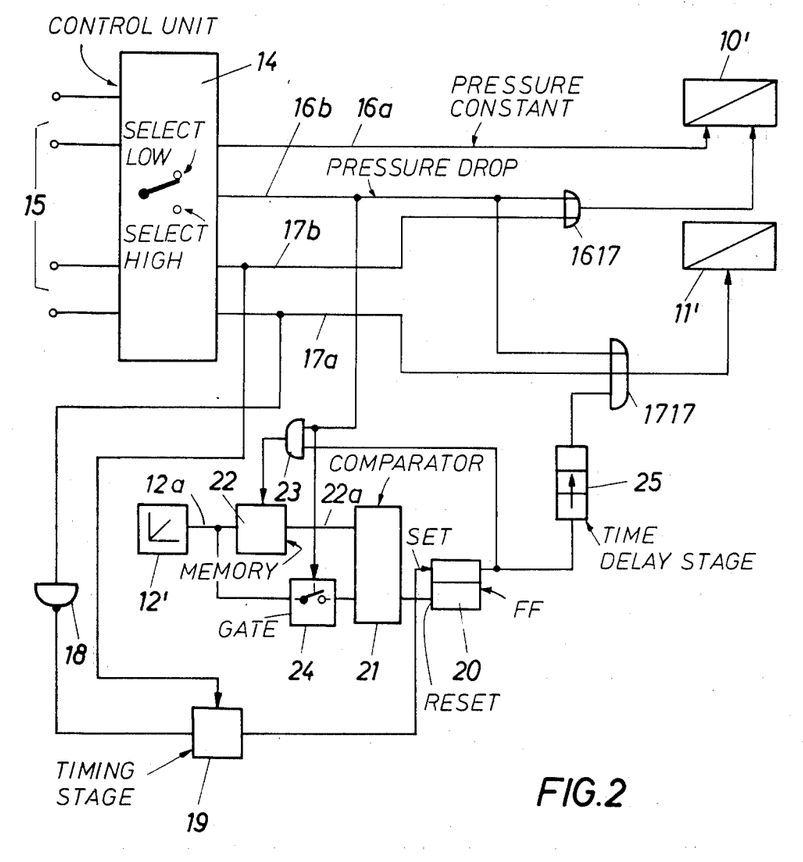
FIG. 2 is a block diagram of an electronic control unit for use with the hydraulic unit of FIG. 1.

One form of a control circuit for the valves of FIG. 1 is shown in FIG. 2. The three-position valve 10, and the two-position valve 11 are represented in FIG. 2 by respective magnetic coils 10', 11', operating the respective valves 10, 11.

Terminals 15 provide speed signals from transducers associated with the wheels. The terminals 15 are coupled to a control unit 14 which may be constructed in accordance with any suitable and well-known anti-skid control unit, by evaluating, respectively, acceleration or deceleration of the respective wheels, rate of acceleration or deceleration, and the like. Control unit 14 provides a signal on an output line 16a if the pressure at the front wheels should be maintained even or constant; it provides a signal over line 16b if the pressure in the brakes of the front wheels should be lowered. Line 17a receives a signal if the rear wheels should retain constant braking pressure; line 17b receives a signal if the pressure in the rear wheel should be dropped or lowered.

The criteria according to which the pressures are to be raised, maintained at a certain level, or dropped, that is, the criteria according to which skidding is being recognized, are not described herein; likewise, the criterion whether control is according to "select-low" and/or "select-high", likewise is not described. The referenced U.S. Pat No. 4,005,910 is referred to for one such system. Increase in pressure, however, is carried out not smoothly or continuously but, rather, in pulses or pressure steps.

The line 17b is connected to a timing stage 19. The duration of a pressure dropping signal on line 17b determines a time period, or elapsed time, of the timing circuit 15. After termination of a constant pressure maintenance phase, that is, a signal on line 17a, the timing interval of the timing circuit 19 begins. Pressure, thus, can be increased during the time interval of the timing circuit 19. The timing interval of the timing circuit is controlled, however, such that the timing interval is less than that which would raise the pressure to reach the same pressure when a pressure drop was first commanded; in other words, the eventual pressure which will be caused by the pressure rise will be below that which triggered initially, a pressure drop.

After the time interval of timing circuit 19 has elapsed, a bistable flip-flop (FF) 20 will change state, which then will control the valve 11 via solenoid 11' so that the rear wheels will maintain constant pressure. The FF 20 will reset upon receipt of an output signal from a comparator 21. Comparator 21 compares input signals representative of two pressures, and provides an output signal when these pressures have a predetermined relation with respect to each other. The comparator 21 has a signal 22a applied thereto which had been stored in a memory 22, and which corresponds to the value of the pressure which is present in the front wheels at the beginning of a pressure drop which follows dropping of pressure at the rear wheels. The memory storage signal is developed at the output of an AND-gate 23 which is responsive to the conjunction of the FF 20 being SET, and a dropping signal being applied on line 16b to the front wheels. The pressure itself is a pressure signal 12a, derived from the transducer 12.

Figure 3:
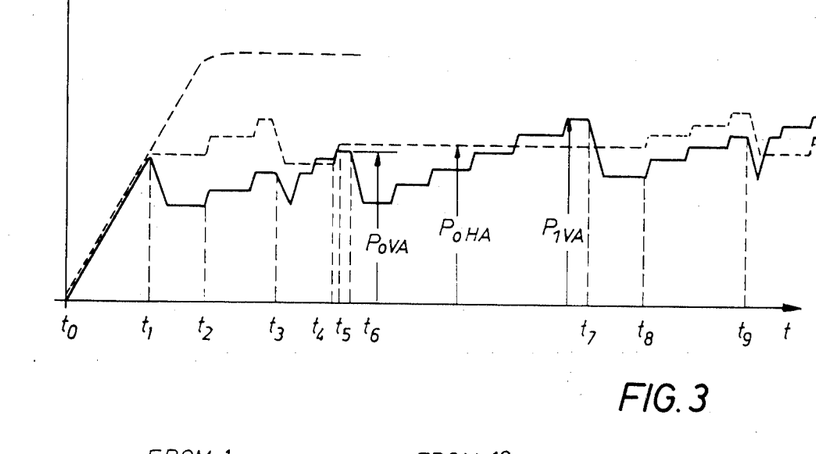
FIG. 3 is a hydraulic pressure (ordinate) vs. time (abscissa) diagram, illustrating the pressure relationships on the wheels of the forward and rear axles a vehicle.

The comparator receives a second input signal representative of the pressure in the front wheels, that is, signal 12a, at the time when a further pressure dropping signal occurs, that is, when a gate 24 is opened. The comparator 21, thus, provides the reset signal when this pressure value from gate 24 differs by a predetermined value from the pressure value at the beginning of a preceding pressure drop in the front wheel. The preceding pressure drop was stored in memory 22. FIG. 3 illustrates various courses or cycles of pressure relationships which may occur based on this control and this formation of the braking circuits or loops.

Referring now to FIG. 3, wherein the braking pressure in the front wheels is shown as a solid line, whereas the braking pressure in the rear wheels is shown in a broken line. At time $t_0$, braking is started. Let it be assumed that, at time $t_1$, a tendency to brake blocking at the front wheels is sensed. The braking pressure at the front wheels is dropped. During the drop in braking pressure, valve 11, via solenoid 11', is controlled to maintain the pressure constant or at an even level in the rear wheels. The control unit 14 is, in accordance with well-known arrangements, controlled to first drop the pressure in the wheels having the tendency to skid, and then maintain it constant, as shown in the solid line of FIG. 3 between time instants $t_1$ and $t_2$. At time $t_2$, that is, upon termination of a pressure maintenance phase, a gradual rise in pressure in both brake circuits, I and II, is commanded. The pressure dropping phase, as well as the pressure maintenance phase in the front wheel circuit, is commanded by the respective positions of the valve 10, by suitable control of the solenoid coil or, for multiple-position, for example, tapped or multiple coils 10', as well known in electromagnetic valve control technology.

Let it be assumed that, at time $t_3$, the rear wheels will have a tendency to skid or block. Control of valve 10 in the third position over line 17b (FIG. 2) permits the pressure in both of the circuits I and II to drop—see connection of line 17b through OR-gate 1617. As controlled by the control unit, a pressure drop is followed by a pressure maintenance phase, which is shown in the time interval for the rear wheels between time $t_3$ and time instant $t_4$. In that time interval, however, the pressure in the front wheels is again raised, in pulses or steps. The pressure increase in the rear wheel circuit II, as described above, is based on a time interval and in dependence on a preceding pressure drop in such a manner that the pressure which will result, namely the pressure $P_{oHA}$, after time $t_5$, will be less than the pressure which caused the pressure drop in the first place, that is, the pressure at time $t_3$—referring to the rear wheel curve in broken lines.

The pressure in the rear wheel braking circuit is maintained at a constant level for a period of time until the pressure relationship in the front wheel permits the conclusion that the coefficient of friction $\mu$ of the surface on which the vehicle operates has increased. This, of course, assumes that there is no longer a tendency of the wheels to block or skid. Increase in frictional coefficient is determined by means of the pressure transducer 12, shown as block 12' in FIG. 2, and the comparator 21, memory 22, AND-gate 23, and the transmission gate 24. The determination of an increase in frictional coefficient to which the front wheels respond is determined by the elements 21 to 24 by storing a signal corresponding to the braking pressure $P_{oVA}$ at the time of the subsequent pressure drop in the front wheel circuit, as seen at time $t_6$ in FIG. 3, and then determining in a subsequent pressure dropping phase in the front wheel braking circuit I, that is, at time $t_7$, if the pressure $P_{1VA}$, at the initiation of the pressure drop, is above the pressure $P_{oVA}$ by a predetermined value. The predetermined value may be a percentage of pressure level, or may be an absolute value. If this is the case, the FF 20 is reset, and the valve 11 is again released, with a slight time delay, effected by timing circuit 25. Timing circuit 25 is provided to prevent a pressure drop. Thereafter, pressure in the front wheels as well as in the rear wheels is again raised, in steps or pulses, as can be seen between time intervals $t_8$ and $t_9$ until, at time $t_9$, skidding is again sensed, and the pressure is dropped once more.

Figure 4:
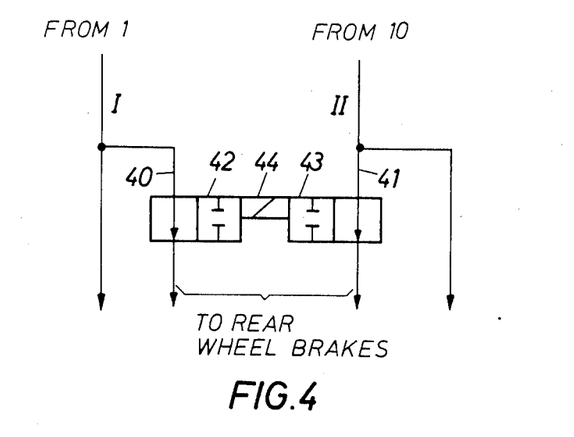
FIG. 4 illustrates a modification to be used with diagonal fluid braking systems.

FIG. 4 illustrates a modification in which two valves 42, 43 are used rather than a single valve 11, if the braking pressure circuits or loops are not subdivided front wheels—rear wheels, that is, with respect to front and rear axles as shown in FIG. 1, but, rather, are of the "diagonal" type. Each one of the lines 40, 41 leading to the rear wheels have respective valves 42, 43 interposed therebetween. These valves can be operated by a single common solenoid 44, that is, the valves may be double-valves, single-operated, in which the solenoid 44 is energized similar to solenoid 11'.

Figure 5:
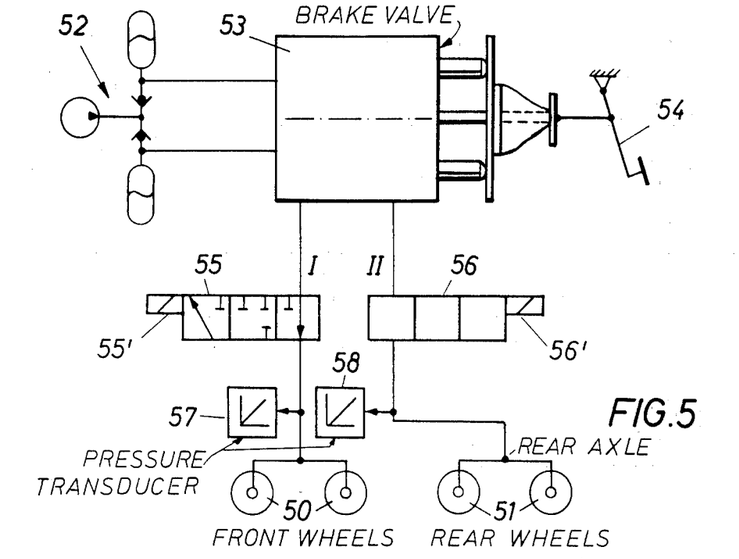
FIG. 5 is a schematic illustration of the hydraulic portion of another embodiment.
Figure 6:
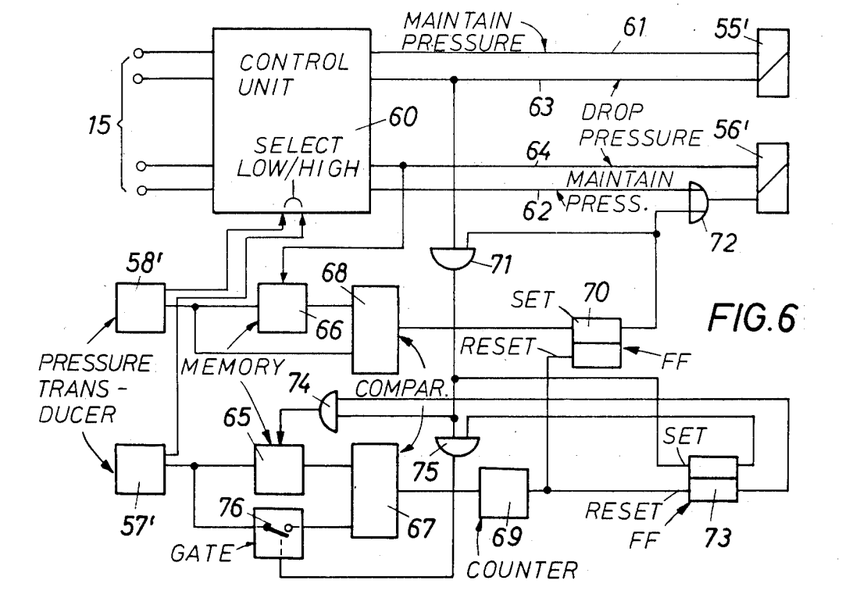
FIG. 6 is a schematic diagram of the electronic control system for use with the hydraulic system of FIG. 5.

FIG. 5 illustrates another arrangement in which the pressure levels for the brakes of the front wheel pair 50 and of the rear wheel pair 51, that is, the braking effect on the wheels of the front axle and on the rear axle, respectively, are derived from a pressure supply source 53 which has two brake valves, both within the supply source 53, and commonly operated from a brake pedal 54. Each one of the braking circuits I and II has a 3/3 valve 55, 56 included therein so that both circuits may have, separately, pressure raised, maintained constant, or dropped. Both circuits have pressure transducers 57, 58 connected thereto, providing output signals representative of braking pressure in the respective circuits. A pump 52 provides, separately for the two main cylinders of unit 53, suitable braking pressure for the individual circuits. The control system for the arrangement of FIG. 5 is shown in FIG. 6. Control unit 60, which corresponds to unit 14 of FIG. 2, supplies output signals to solenoids 55', 56' of the valves 55, 56. The valves are controlled by lines 61, 62, 63, 64. Lines 61, 62 control maintenance of pressure at a constant level; lines 63, 64 control drop in pressure. Pressure sensors 57, 58, shown in block form at 57', 58' in FIG. 6, provide signals to memories 65, 66, which are connected to comparators 67, 68. Counter 69 is connected to the output of comparator 67 and to the FF 70. The system, further, includes an FF 73, AND-gates 71, 74, 75, an OR-gate 72, and a switch-type gate 76.

Figure 7:
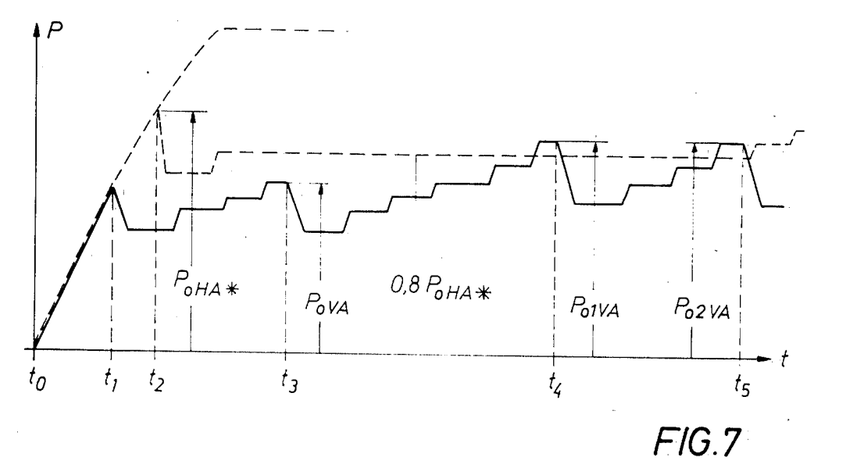
FIG. 7 is a timing diagram illustrating the braking pressure on the wheels of the forward and rear axle.

Operation, with reference to FIG. 7: Let it be assumed that braking is initiated at time $t_0$. The pressure is dropped in the front axle circuit I at $t_1$, as shown in the fullline graph on FIG. 7. The control cycle, as commanded by the control unit 60, then will continue in well-known manner, for example as explained in the referenced patent, and as known, in general, in the field of anti-skid braking. The rear axle braking circuit, as shown in the broken-line curve, continues to supply pressure until a tendency to skid is sensed, time $t_2$, at which time the pressure is dropped, followed by a constant or pressure maintenance phase. The pressure level $P_{oHA^*}$ in the circuit II for the rear axle wheels is stored at the time the peak pressure was reached, that is, just as the pressure was to drop. This pressure is stored in the memory 66. Comparator 68 provides a signal when, subsequently, the pressure in the rear axle wheel brake circuit II rises to a predetermined level, for example 80% of $P_{oHA^*}$. This signal causes the FF 70 to change state, so that, due to the output signal thereof, the pressure maintenance connection to the solenoid 56' is energized through the OR-gate 72.

Memory 65 stores the pressure $P_{oVA}$ in the front wheel axle circuit I at the beginning of the next pressure drop, that is, at time $t_3$. The "store" signal is generated at the initiation of the pressure drop signal available on line 63 and applied through AND-gate 71, which forms the conjunctive logic condition that the FF 70 has been SET. The AND-gate 71, therefore, is conductive, and FF 73 is SET, thus blocking through its inverting output AND-gate 74, while rendering AND-gate 75 conductive through its direct output. Subsequent pressure drop signals on line 63 will thus cause the gate 76 to open, that is, the switch will be closed, so that signals corresponding to the pressure level $P_{o1VA}$ and $P_{o2VA}$ can be compared with the stored signal $P_{oVA}$ in comparator 67. The comparator provides a signal to the counter 69 when the pressure levels $P_{o1VA}$ and $P_{o2VA}$ exceed the pressure $P_{oVA}$ by a predetermined value or level. The counter 69 is so set that, after it has counted to two, that is, received two output signals from the comparator 67, it provides an output signal which resets the FF 70, and thus terminates the constant pressure maintenance phase in the rear wheel axle braking circuit II. The pressure can then rise, in pulsed steps under command of the control unit 60, until again, there is a tendency to skid. The bistable FF 73 is reset together with the resetting of FF 70.

The pressure sensor or transducer 57, 57' for the front wheels can, additionally, be used to determine if the pressure on the front wheels should be controlled with respect to "select-low" or "select-high" mode. For example, a predetermined pressure level can be set from which, in any case, control will be in accordance with the "select-low" mode. In passenger vehicles, a suitable pressure level is, for example, about 60 bar. Changeover to "select-high" which might be dangerous on a slick or wet road-way, particularly under high pressure, is thereby avoided.

Figure 8:
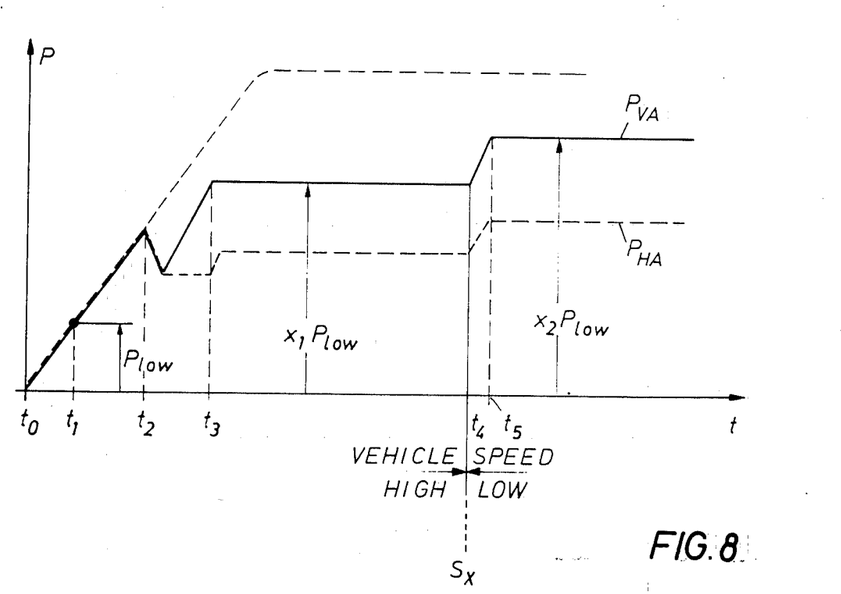
FIG. 8 is a further pressure-timing diagram.

Control can also be carried out of the selection switchover in the system according to FIG. 1. FIG. 8 illustrates the arrangement, which is based on the system shown in FIGS. 1 and 2. First, in the time from $t_o$ to $t_1$, "select-low" operation on the wheels of the front axle—full-line—is effective. At $t_1$, one of the front wheels becomes unstable. The control cycle is inhibited, however, due to instantaneous switch-over to "select-high" mode; additionally, the instantaneous pressure $P_{low}$ is stored. The front wheel braking circuit then will have a pressure level of $X_1 \cdot P_{low}$ controlled therein. The factor $X_1$ may be, for example, between 2 and 3. This situation will obtain at time $t_3$. The prior short time pressure drop at $t_2$ occurred due to an instability at the rear wheels; this pressure drop at the front wheels is undesired, however, the pressure drop at the front wheels merely a consequence of a tendency to skid on one of the rear wheels. Once the pressure $X_1 \cdot P_{low}$ is commanded, presssure is maintained constant over the valve 10.

FIG. 8 additionally illustrates the case in which the factor X is made dependent on vehicle speed. The dependency is so arranged that, up to a speed threshold $S_X$, a factor of X is used, in which $X_2$ is greater than $X_1$; beyond the threshold $S_X$, the lower valued factor $X_1$ is used. Consequently, at the time the speed threshold $S_X$ is passed in downward direction, that is, at $t_4$, $X_2$ becomes effective, which causes an increase in pressure.

A similar control may also be effected on the rear wheels; FIG. 8 illustrates the situation in which the rear wheels are controlled by "select-low" mode, that is, up to time $t_4$; the curve for the rear wheels corresponds to that of FIG. 3. When the threshold $S_X$ is passed in downward direction, however, the pressure at the rear wheels is increased in the time period between $t_4$ and $t_5$.

Various changes and modifications may be made, and any features described herein with respect to any one of the embodiments may be used with any of the others, within the scope of the inventive concept.

I claim:

1. In a vehicle anti-skid or anti-brake-lock system having
    an electronic control unit (14, 60) receiving wheel speed signals, processing said wheel speed signals and providing brake pressure control signals for both wheels on the front axle of the vehicle and, separately, in a rear axle brake system (II) for both wheels of the rear axle of the vehicle,
    and wherein the electronic control unit is operable, selectively, in a "select-low" control range and a "select-high" control range,
    a method of controlling the brake pressure control signals,
    comprising, in accordance with the invention, the steps of
    sensing (12; 57, 58) the braking pressure applied to the front wheels (50) of the vehicle and delivering a front wheel pressure signal;
    applying said front wheel pressure signal to the electronic control unit;
    generating, in the electronic control unit, pressure control signals to control the braking pressure of the rear wheels (51);
    sensing if, in response to a tendency of the rear wheels to block or skid, the braking pressure in at least one of the rear wheels has dropped,
    and, if so, providing a pressure drop signal;
    controlling the pressure to said at least one rear wheel to have a value or level ($P_{oHA}$) which is below the pressure at which the tendency to block was sensed;
    sensing if a controlled maximum pressure ($P_{1VA}$) at the front wheels (50) in a subsequent control cycle has increased above a maximum pressure ($P_{oVA}$) of the preceding cycle, and, if so, providing a comparison signal;
    controlling the pressure in the rear wheel braking system at a steady or constant level until said comparison signal is received;
    and then increasing the pressure in the rear wheel braking system (II).

2. Method according to claim 1, further comprising the step of:
    sensing braking pressure in the rear wheel braking system (II); and
    wherein the step of controlling the pressure to said at least one rear wheel to have said value or level ($P_{oHA}$) which is below the pressure at which the tendency to block was sensed comprises
    controlling the pressure in the rear wheel (51) braking system (II) as a function of the sensed pressure in the rear wheel braking system.

3. Method according to claim 1, wherein (FIG. 1) the step of sensing a pressure comprises sensing the position of a pressure generating piston in the braking system.

4. Method according to claim 1, including the step of evaluating the braking pressure in the braking system (I) for the front wheels (50) of the front axle of the vehicle;
    and controlling switch-over between modes of operation of the control units (14, 60) "select-low" and "select-high" as a function of pressure in the front wheel braking circuit.

5. Method according to claim 4, wherein the switchover control step comprises inhibiting change-over in mode of operation to "select-high" if the sensed pressure exceeds a predetermined level.

6. Method according to claim 5, to control the braking system of a passenger vehicle;
    and wherein the sensed pressure at which changeover to "select-high" is inhibited is in the order of about 60 bar.

7. Method acording to claim 6, including the step of sensing the pressure in the front wheel system and, if the control unit (14, 16) is in the "select-low" condition, switching over to "select-high";

and controlling the braking pressure in the front wheel system to be at a level of "select-low" times a factor of between about 2 and 3.

8. Method according to claim 7, further including the step of switching the control mode of the control unit (14, 60) in the rear braking system (II) to "select-high" and controlling the braking pressure to a level of the "select-low" modes times a factor of between about 2 and 3.

9. Method according to claim 7, further including the step of sensing the speed of the vehicle;

and changing the factor in dependence on vehicle speed in a direction to increase the factor as the speed of the vehicle decreases.

10. Vehicle anti-skid or anti-brakelock system having means (1, 2) for providing a pressure braking fluid; a front wheel braking system (I); a rear wheel braking system (II); an electronic control unit (14, 60) receiving wheel speed signals, processing said wheel speed signals and providing brake pressure control signals for controlling application of braking pressure by said pressure brake fluid providing means to at least one front wheel on a front axle (50) of the vehicle in the front wheel braking system (I) and, separately, to at least one rear wheel of the rear braking system (II) on a rear axle of the vehicle, and wherein the electrical control unit (14, 60) is operative in a "select-low" control range and a "select-high" control range, comprising means (12; 57, 58) for sensing the braking pressure applied to the at least one front wheel (50) of the vehicle and deriving a front wheel pressure signal;

means for applying said front wheel pressure signal to the electronic control unit;

and wherein said pressure control signals to control the braking pressure in the at least one rear wheel (51) of the vehicle are generated by said electronic control unit:

(1) to control, after a drop in braking pressure at the at least one rear wheel (51), as a consequence of sensed blocking or tendency to block of the at least one rear wheel, the pressure applied to the at least one rear wheels to be at a level ($P_{oHA}$) which is below the pressure at which the tendency to skid or block is sensed;

(2) to, thereafter, control the pressure applied to the at least one of the rear wheels to remain at a constant level, until a controlled maximum pressure ($P_{1VA}$) on at least one of the front wheels (50) has increased with respect to a maximum pressure ($P_{oVA}$) in a preceding cycle, at the at least one of the front wheels, by a predetermined level or value; and (3) and to, thereafter, increase the pressure in the braking system (II) for the wheel (51) of the rear axle.

11. System according to claim 10, further including a braking pressure transducer (58) for the brake of the at least one wheel (51) at the rear axle to obtain a rear-axle braking pressure signal and coupled to the control unit;

and wherein the control unit (14, 60) is connected to the braking system (II) controlling the brake of the at least one wheel (51) of the rear axle to said level (P0HA*), said level being a predetermined, set pressure level or value (0.8 $P_{oHA*}$) which is below the pressure level or value ($P_{oHA*}$) at which said pressure drop was commanded by said control unit.

12. System according to claim 11, wherein the pressure brake fluid providing means includes a master cylinder—piston system (1, 2);

and wherein the means for sensing the braking pressure applied to the at least one front wheel includes a pressure sensor (12) coupled to the piston and providing a pressure signal representative of travel of said piston in the cylinder, and hence of pressure within the cylinder.

13. System according to claim 10, including (FIG. 1) means (5, 8) for generating braking pressure in the braking system (II) for the at least one wheel (51) of the rear axle;

a main braking piston-cylinder combination (I, II) having a control chamber (3) for generating braking pressure in the fluid circuit (I) for the at least one wheel (50) at the front axle of the vehicle, the control chamber being connected to and operated by the pressure level within the pressure generating means (5);

a multi-position brake pressure control valve (10) connected to and controlled by the control unit (14, 60) included between the means for generating braking pressure in the braking system (II) for the wheel (51) at the rear axle, and further connected to the control chamber (3) to provide for common rise in braking pressure, common pressure constant or maintenance phase and common pressure drop at the outputs of the multi-position brake pressure control valve in the braking system connected to the wheel (51) of the rear axle (II) as well as in the control chamber;

and further comprising a blocking valve (II) connected to and controlled by said control unit (14) and hydraulically connected between an output line from the multi-position brake pressure control valve (10) to at least one brake cylinder of the at least one rear wheel (51) at the rear axle of the vehicle.

14. System according to claim 13, wherein the respective braking systems (I, II) are connected to both wheels (50, 51) at the front axle and at the rear axle, respectively;

and wherein the output or downstream line from the blocking valve (11) is connected in the braking system (II) associated with both wheels (51) of the rear axle of the vehicle.

15. System according to claim 13, wherein the braking systems (I, II) include brake pressure circuits (I, II), connected in "diagonal" mode, each pressure fluid circuit controlling one front wheel (50) and, diagonally positioned with respect to the vehicle, one rear wheel (51);

and wherein said blocking valve (43) is connected in the connection lines to both of the rear wheels (51) at the rear axle and comprises one blocking valve chamber connected to the output of said brake pressure control valve, and another blocking valve chamber connected to the output of the main braking piston-cylinder combination, both of said chambers being controlled by the control unit (14).

16. System according to claim 10, wherein the means for sensing the braking pressure includes a pressure transducer (12; 57, 58) coupled to the control unit (14, 60) to provide a control signal thereto for, selectively, controlling change-over of the control mode of the control unit between "select-low" and "select-high" modes.

17. System according to claim 16, wherein the control unit (60) changes over or maintains the "select-high" operating mode upon sensing unstable braking operation or tendency to block or skid of at least one of the front wheels (50) at a pressure, as sensed and determined by the transducer at the front wheel brakes ($P_{low}$), and controls the pressure at the front wheel brakes to a level in the "select-high" mode which is at a factor of between 2 to 3 times the pressure which was sensed when the control unit was in the "select-low" mode ($X_1 \cdot P_{low}$; $X_1 \approx 2$–3).

18. System according to claim 17, wherein the control unit also changes the operating mode with respect to the rear wheels (51) of the vehicle to "select-high" when the operating mode with respect to the at least one front wheel (50) is changed to "select-high";

and wherein the braking pressure set at the at least one rear wheel is increased by a factor ($X_3$) which is at least approximately similar to the pressure increase factor ($X_1$) with which the front wheel braking pressure is increased.

19. System according to claim 17, wherein said factor ($X_1$) of pressure level multiplication is dependent on and changes with speed of the vehicle, and increases as the speed of the vehicle decreases.

20. System according to claim 17, wherein said factors ($X_1$, $X_3$) are set at a predetermined level for a vehicle speed above a predetermined speed range, and for a higher value when the vehicle speed drops below a threshold ($S_X$) at which the vehicle speed changes to a lower speed range.

21. System according to claim 10, wherein the system includes means (11; 42, 43; 56) for blocking application of pressure rise to both the brakes of two rear wheels (51) of the vehicle connected to and controlled by said control unit (14, 60) independently of, or in addition to application of the control signals from the control unit (14, 60) which control braking pressure at both the front wheels (50).

* * * * *